(12) United States Patent
Ishida

(10) Patent No.: US 12,305,047 B2
(45) Date of Patent: May 20, 2025

(54) INKJET INK AND INKJET RECORDING APPARATUS

(71) Applicant: KYOCERA Document Solutions Inc., Osaka (JP)

(72) Inventor: Azumi Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 199 days.

(21) Appl. No.: 18/352,088

(22) Filed: Jul. 13, 2023

(65) Prior Publication Data

US 2024/0026173 A1    Jan. 25, 2024

(30) Foreign Application Priority Data

Jul. 22, 2022    (JP) ................. 2022-117047

(51) Int. Cl.
*C09D 11/32* (2014.01)
*B41J 2/165* (2006.01)
*B41J 2/21* (2006.01)
*C09D 11/322* (2014.01)

(52) U.S. Cl.
CPC ......... *C09D 11/322* (2013.01); *B41J 2/16535* (2013.01); *B41J 2/2146* (2013.01); *B41J 2002/1655* (2013.01)

(58) Field of Classification Search
CPC .................................................. C09D 11/322
See application file for complete search history.

(56) References Cited

U.S. PATENT DOCUMENTS

| | | |
|---|---|---|
| 7,252,710 B2 | 8/2007 | Kano et al. |
| 2005/0284335 A1 | 12/2005 | Kano et al. |
| 2021/0060993 A1* | 3/2021 | Hayamizu .............. C09D 11/38 |

FOREIGN PATENT DOCUMENTS

| | | | |
|---|---|---|---|
| JP | 6769516 B1 * | 10/2020 | .......... B41M 5/0023 |
| WO | 2004/003085 A1 | 1/2004 | |

* cited by examiner

*Primary Examiner* — Sharon Polk
(74) *Attorney, Agent, or Firm* — Studebaker Brackett PLLC

(57) ABSTRACT

An inkjet ink contains a quinacridone pigment, a resin, and an aqueous medium. The resin includes an adsorbed resin adsorbed to the quinacridone pigment and a non-adsorbed resin not adsorbed to the quinacridone pigment. The non-adsorbed resin has a percentage content in the resin of greater than 0% by mass and no greater than 40% by mass. The aqueous medium contains a first organic solvent with a boiling point of at least 180° C. and no greater than 280° C. On an ultraviolet-visible absorption spectrum of a 25-fold dilution of a supernatant, the absorbance at a specific peak is no greater than 0.15. The supernatant is obtained by centrifugation of the inkjet ink at 1,050,000 G for 3 hours. The specific peak is a maximum peak in a wavelength range of the ultraviolet-visible absorption spectrum of at least 400 nm and no greater than 490 nm.

9 Claims, 5 Drawing Sheets

INKJET INK AND INKJET RECORDING APPARATUS

INCORPORATION BY REFERENCE

The present application claims priority under 35 U.S.C. § 119 to Japanese Patent Application No. 2022-117047, filed on Jul. 22, 2022. The contents of this application are incorporated herein by reference in their entirety.

BACKGROUND

The present disclosure relates to an inkjet ink and an inkjet recording apparatus.

Inkjet inks are demanded to contain a pigment dispersed therein. In a pigment dispersion composition, the piment is dispersed using a carbodiimide compound having at least one carbodiimide group and at least one selected from the group consisting of a pigment derivative, a pigment intermediate, a dye derivative, and a dye intermediate.

SUMMARY

An inkjet ink according to an aspect of the present disclosure contains a quinacridone pigment, a resin, and an aqueous medium. The resin includes an adsorbed resin adsorbed to the quinacridone pigment and a non-adsorbed resin not adsorbed to the quinacridone pigment. The non-adsorbed resin has a percentage content in the resin of greater than 0% by mass and no greater than 40% by mass. The aqueous medium contains a first organic solvent with a boiling point of at least 180° C. and no greater than 280° C. On an ultraviolet-visible absorption spectrum of a 25-fold dilution of a supernatant, an absorbance at a specific peak is no greater than 0.15. The supernatant is obtained by centrifugation of the inkjet ink at 1,050,000 G for 3 hours. The specific peak is a maximum peak in a wavelength range of the ultraviolet-visible absorption spectrum of at least 400 nm and no greater than 490 nm.

An inkjet recording apparatus according to an aspect of the present disclosure includes a conveyance section that conveys a recording medium and a recording head that ejects an ink toward the recording medium. The ink is the aforementioned inkjet ink.

DETAILED DESCRIPTION

Figure 1:
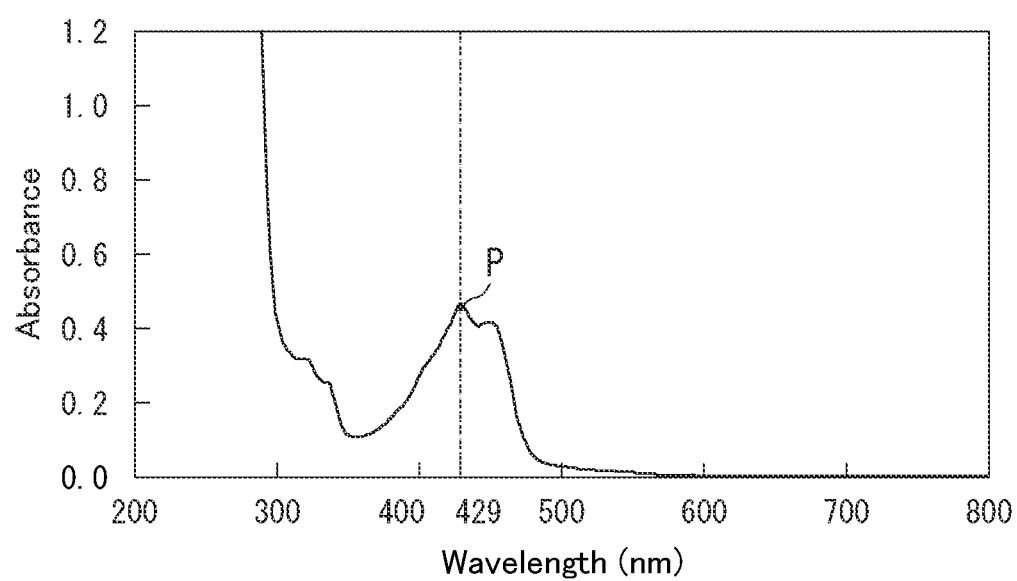
FIG. 1 is a graph representation showing an example of an ultraviolet-visible absorption spectrum of a 25-fold dilution of a supernatant.

The following describes embodiments of the present disclosure. Terms used in the present specification are explained first. Values for volume median diameter ($D_{50}$) are values as measured using a dynamic light scattering type particle size distribution analyzer (e.g., "ZETASIZER (registered Japanese trademark) NANO ZS", product of Malvern Instruments Ltd.) unless otherwise stated. Values for acid value are values as measured in accordance with the Japanese Industrial Standards (JIS) K0070:1992 unless otherwise stated. Values for mass average molecular weight (Mw) are values as measured using gel permeation chromatography unless otherwise stated. In the present specification, the term "(meth)acryl" is used as a generic term for both acryl and methacryl. The phrase "each represent, independently of one another," in description about formulas means possibly representing the same group or different groups. For each component indicated in the present specification, one type of the component may be used independently, or two or more types of the component may be used in combination.

First Embodiment: Inkjet Ink

The following describes an inkjet ink (also referred to below simply as ink) according to a first embodiment of the present disclosure.

The ink of the first embodiment contains a quinacridone pigment, a resin, and an aqueous medium. The resin includes an adsorbed resin adsorbed to the quinacridone pigment and a non-adsorbed resin not adsorbed to the quinacridone pigment. The non-adsorbed resin has a percentage content in the resin of greater than 0% by mass and no greater than 40% by mass. The aqueous medium contains a first organic solvent with a boiling point of at least 180° C. and no greater than 280° C. On an ultraviolet-visible absorption spectrum of a 25-fold dilution of a supernatant, an absorbance at a specific peak is no greater than 0.15. The supernatant is obtained by centrifugation of the ink at 1,050,000 G for 3 hours. The specific peak is a maximum peak in a wavelength range of the ultraviolet-visible absorption spectrum of at least 400 nm and no greater than 490 nm.

In the following, the "percentage content of the non-adsorbed resin in the resin" may be also referred to below as "non-adsorbed resin rate". The "first organic solvent" may be also referred to below as "first solvent". The "supernatant obtained by centrifugation of the ink at 1,050,000 G for 3 hours" may be also referred to below simply as "supernatant". The "absorbance at the specific peak on the ultraviolet-visible absorption spectrum of the 25-fold dilution of the supernatant obtained by centrifugation of the ink at 1,050,000 G for 3 hours" may be referred to as "specific absorbance". In the present specification, the "specific peak" is defined as a "maximum peak in a wavelength range of the ultraviolet-visible absorption spectrum of at least 400 nm and no greater than 490 nm".

As a result of having the above features, the ink of the first embodiment can inhibit occurrence of skewed ink ejection from a recording head. Reasons thereof can be inferred as follows.

For ease of understanding, a quinacridone pigment synthesis method is summarized first. The quinacridone pigment is a compound represented by formula (D), for example. The quinacridone pigment is synthesized through reactions represented by reaction formulas (r-a), (r-b), and (r-c).

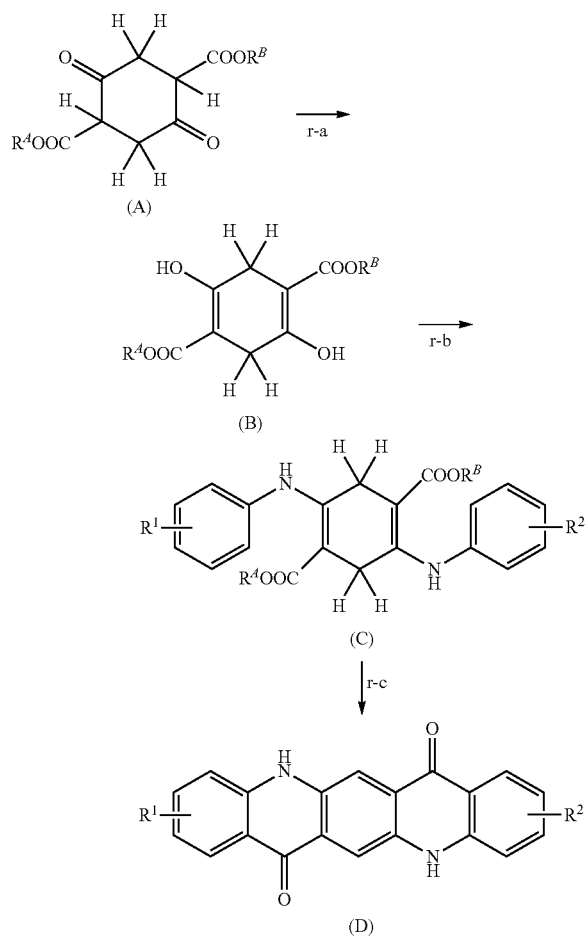

In formulas (A), (B), (C), and (D), $R^A$, $R^B$, $R^1$, and $R^2$ each represent, independently of one another, a monovalent group. In the following, the "reactions represented by reaction formulas (r-a), (r-b), and (r-c)" may be also referred to below as "reactions (r-a), (r-b), and (r-c)", respectively. Furthermore, "the compounds represented by formulas (A), (B), (C), and (D)" may be also referred to below as "compounds (A), (B), (C), and (D)", respectively. Where $R^1$ and $R^2$ each represent a methyl group, the compound (D) is C.I. Pigment Red 122. Where $R^1$ and $R^2$ each represent a hydrogen atom, the compound (D) is C.I. Pigment Violet 19.

In the course of the reactions (r-a), (r-b), and (r-c), the compounds (B) and (C) are produced each as an intermediate. The quinacridone pigment synthesis method has been explained so far.

The intermediates (more specifically, the compounds (B) and (C)) produced in the course of the reactions (r-a), (r-b), and (r-c) may remain in the quinacridone pigment as impurities. Containment of a quinacridone pigment such as above in an ink results in containment of the intermediates in the ink. The intermediates have relatively high polarity. Therefore, when an image is formed using the ink containing a quinacridone pigment, such as above the intermediates may electrostatically attach to the ejection surfaces of recording heads and the inner wall of nozzle orifices. The attached intermediates serve as a cause of skewed ink ejection from the recording head. Furthermore, once the ink attached to the ejection surface dries and thickens, the intermediates contained in the ink may cause agglomeration of the ink components to generate agglomerate. The generated agglomerate also serves as a cause of skewed ink ejection from the recording head. In view of the foregoing, the specific absorbance of the 25-fold dilution of the supernatant is set to no greater than 0.15 in the ink of the first embodiment. The specific peak is a peak derived from the intermediates (specific examples include the compounds (B) and (C)) for synthesis of the quinacridone pigmen, for example. As a result of the specific absorbance of the 25-fold dilution of the supernatant being set to no greater than 0.15, relatively small amounts of intermediates being impurities remain. Thus, inhibition of occurrence of skewed ink ejection from the recording head can be achieved.

Furthermore, the ink contains a resin in order to disperse the quinacridone pigment in the aqueous medium. The resin includes an adsorbed resin adsorbed to the quinacridone pigment and a non-adsorbed resin not adsorbed to the quinacridone pigment. The non-adsorbed resin may electrostatically attach to the ejection surfaces of the recording heads and the inner walls of the nozzle orifices. The attached non-adsorbed resin also serves as a cause of skewed ink ejection from the recording head likewise the intermediates. Furthermore, once the ink attached to the ejection surface dries and thickens, the non-adsorbed resin contained in the ink may cause agglomeration of the ink components to generate agglomerate. The generated agglomerate also serve as a cause of skewed ink ejection from the recording head. In view of the forgoing, the non-adsorbed resin rate is set to greater than 0% by mass and no greater than 40% by mass in the ink of the first embodiment. The ink having a non-adsorbed resin rate of greater than 0% by mass and no greater than 40% by mass can inhibit occurrence of skewed ink ejection from the recording head because the amount of the non-adsorbed resin is relatively small.

Furthermore, the aqueous medium contains the first solvent with a boiling point of at least 180° C. and no greater than 280° C. in the ink of the first embodiment. The boiling point of the first solvent is relatively high. As such, the ink attached to the ejection surface of the recording head is difficult to dry and thicken. Therefore, occurrence of agglomeration of the ink components due to presence of the intermediates and the non-adsorbed resin in the ink can be inhibited, thereby inhibiting generation of agglomerate. As a result, occurrence of skewed ink ejection from the recording head can be inhibited.

Reasons why the ink of the first embodiment can inhibit skewed ink ejection from the recording head have been described so far. The ink of the first embodiment is described further in detail below.

<Specific Absorbance>

The specific absorbance is described below with reference to FIG. 1. FIG. 1 is a graph representation showing an ultraviolet-visible absorption spectrum of a 25-fold dilution of a supernatant obtained by centrifugation of a reference ink at 1,050,000 G for 3 hours. Note that the reference ink differs from later-described inks of Examples and Comparative Examples but is presented as an example for explaining a method for obtaining the specific absorbance. The reference ink contains at least a quinacridone pigment (C.I. Pigment Red 122), a resin (resin (R-A) described later), and an aqueous medium. In FIG. 1, the vertical axis indicates absorbance and the horizontal axis indicates wavelength (unit: nm). The ultraviolet-visible absorption spectrum of the 25-fold dilution of the supernatant obtained from the reference ink is plotted by a method described later in Examples. The plotted spectrum is shown in FIG. 1.

The specific peak P in FIG. 1 is a maximum peak in a wavelength range of the ultraviolet-visible absorption spectrum of at least 400 nm and no greater than 490 nm. The maximum peak means a peak having a maximum absorbance among peaks (i.e., apexes) in convex curves appearing in a specific wavelength range.

In the example shown in FIG. 1, it can be confirmed that a peak with a maximum absorbance appears at a wavelength of 429 nm among spectrum peaks appearing in a wavelength range of at least 400 nm and no greater than 490 nm. As such, the peak P with a wavelength of 429 nm is the specific peak P. When the absorbance at the specific peak P is read from the ultraviolet-visible absorption spectrum, the specific absorbance can be obtained. The method for obtaining the specific absorbance of the 25-fold dilution of the supernatant has been described so far with reference to FIG. 1. The specific absorbance of the 25-fold dilution of the supernatant is further described below.

As has been described previously, the specific absorbance of the 25-fold dilution of the supernatant is no greater than 0.15. In order to inhibit occurrence of skewed ink ejection from the recording head, the specific absorbance of the 25-fold dilution of the supernatant is preferably no greater than 0.10. The lower limit of the specific absorbance of the 25-fold dilution of the supernatant is not limited particularly, but may be at least 0.05, for example. For example, the specific peak P is a peak derived from the intermediates for synthesis of the quinacridone pigment that are contained in the ink. More specifically, the specific peak P is a peak derived from the compounds (B) and (C) being the intermediates contained in the ink. As such, the specific absorbance can be adjusted by changing the amount of the intermediates in the ink containing a pigment dispersion by changing the amount of the intermediates in the pigment dispersion. The amount of the intermediates can be changed by changing the number of times of passing of the pigment dispersion in activated carbon treatment described later in Examples, for example. The specific absorbance of the 25-fold dilution of the supernatant tends to be small as the number of times of passing of the pigment dispersion in the activated carbon treatment is increased because the activated carbon treatment removes at least a portion of the intermediates. The pigment dispersion is washed by filter pressing, for example. The amount of the intermediates can be changed also by changing the number of times of washing by filter pressing.

<Quinacridone Pigment>

Examples of the quinacridone pigment contained in the ink include C.I. Pigment Violet (19 or 42), C.I. Pigment Red (122, 202, 206, 207, or 209), and C.I. Pigment Orange (48 or 49).

Examples of commercially available products that can be used as the quinacridone pigment include "TRM-11" produced by Dainichiseika Color & Chemicals Mfg. Co., Ltd., "CINQUASIA (registered Japanese trademark) MAGENTA D4550" produced by BASF, "CINQUASIA (registered Japanese trademark) PINK D4450" produced by BASF, "INKJET MAGENTA E-S" produced by Clariant (Japan) K.K., "HOSTAPERM PINK E 02" produced by Clariant (Japan) K.K., "HOSTAPERM RED E3B" produced by Clariant (Japan) K.K., and "HOSTAPERM RED E5B 02" produced by Clariant (Japan) K.K.

The quinacridone pigment has a percentage content in the ink of preferably at least 1% by mass and no greater than 12% by mass, and more preferably at least 4% by mass and no greater than 8% by mass. As a result of the percentage content of the quinacridone pigment being set to at least 1% by mass, images formed with the ink can have favorable image density. As a result of the percentage content of the quinacridone pigment being set to no greater than 12% by mass by contrast, the ink can have favorable fluidity. The ink may contain only the quinacridone pigment as a pigment. Alternatively, the ink may further contain any other pigments as a pigment in addition to the quinacridone pigment in order to adjust hue of the ink.

The quinacridone pigment synthesis method, which has been summarized previously, is described in more detail below.

Examples of the monovalent group represented by $R^A$ and $R^B$ in formulas (A), (B), and (C) includes an alkyl group and an aryl group. The monovalent group represented by $R^A$ and $R^B$ is preferably an alkyl group, more preferably an alkyl group with a carbon number of at least 1 and no greater than 6, and further preferably an ethyl group.

Examples of the monovalent group represented by $R^1$ and $R^2$ in formulas (C) and (D) include a hydrogen atom, an alkyl group, and a halogen atom. The halogen atom represented by $R^1$ and $R^2$ is preferably a chlorine atom. The alkyl group represented by $R^1$ and $R^2$ is preferably an alkyl group with a carbon number of at least 1 and no greater than 6, and more preferably a methyl group.

In the reaction (r-a), the compound (B) is obtained from the compound (A). Next in the reaction (r-b), 1 mole equivalent of the compound (B) is caused to react with 2 mole equivalents of an aniline derivative to obtain 1 mole equivalent of the compound (C). Next in the reaction (r-c), the compound (C) is oxidized to obtain an oxide of the compound (C). Next in the reaction (r-c), the oxide of the compound (C) is hydrolyzed to obtain a hydrolysate. Next in the reaction (r-c), a dehydration-ring-closure reaction of the hydrolysate is caused using a catalyst to obtain the compound (D). The reaction temperature of the dehydration-ring-closure reaction is at least 90° C. and no greater than 120° C., for example. The reaction time of the dehydration-ring-closure reaction is at least 1 hour and no greater than 2 hours, for example.

After the reaction (r-c), solvent treatment (also referred to below as treatment A) and post-treatment (also referred to below as treatment B) may be performed on the quinacridone pigment, for example.

(Treatment A)

In the treatment A, the quinacridone pigment is treated with a solvent. The quinacridone pigment before the treatment A may be called crude and is in the form of aggregated particles with low crystallinity. The quinacridone before the treatment A has insufficient colorability. As such, the treatment A is performed to prompt crystal growth and micronization of the quinacridone pigment. As a result of micronization of the quinacridone pigment being prompted, the quinacridone pigment can have favorable colorability and chroma. An example of the treatment of the quinacridone pigment is kneading the quinacridone pigment and a solvent using a kneader (e.g., salt mill kneader). The temperature and the time period of the treatment of the quinacridone pigment are not limited particularly and are appropriately set so that the quinacridone pigment has desired particle diameter and particle size distribution. Furthermore, in the treatment A, an inorganic base (specific examples include sodium hydroxide and potassium hydroxide) may be added as necessary as a pulverization aid. The kneaded product of the quinacridone pigment obtained in the treatment A is washed with water or a solvent as needed to be collected as a wet cake.

(Treatment B)

In the treatment B, post-treatment is performed on the kneaded product of the quinacridone pigment obtained in the treatment A. As a result of the treatment B being performed, agglomeration of the micronized quinacridone pigment is inhibited. An example of the post-treatment is separation of the quinacridone pigment by removing the solvent from the kneaded product of the quinacridone pigment. Examples of a method for separating the quinacridone pigment include filtration, drying, and solvent distillation using a rotary evaporator. In solvent distillation, the temperature of solvent distillation is a temperature equal to or higher than the boiling point of the solvent, for example.

After the treatment B, washing (e.g., washing by filter pressing), drying, and crashing are performed on the separated quinacridone pigment as necessary. However, the intermediates may still remain in the quinacridone pigment even after washing. In view of the foregoing, it is preferable to remove at least a portion of the intermediates by performing activated carbon treatment and the like on the pigment dispersion. This can inhibit occurrence of skewed ink ejection from the recording head.

<Resin>

A portion of the resin contained in the ink is adsorbed to the quinacridone pigment, for example. The resin is hydrophilic. Therefore, adsorbed resin adsorbed to the surface of the quinacridone pigment disperses the quinacridone pigment in the aqueous medium. The resin as above is also called pigment dispersion resin.

The resin includes an adsorbed resin and a non-adsorbed resin. That is, the ink contains the adsorbed resin and the non-adsorbed resin as the resin. The adsorbed resin is adsorbed to the quinacridone pigment. The adsorbed resin constitutes pigment particles together with the quinacridone pigment, for example. The pigment particles each include a core and a coat layer covering the core, for example. The cores of the pigment particles contain the quinacridone pigment. The coat layers of the pigment particles contain the resin. By contrast, the non-adsorbed resin is not adsorbed to the quinacridone pigment. The non-adsorbed resin is free in the aqueous medium.

As has been described previously, the non-adsorbed resin rate is greater than 0% by mass and no greater than 40% by mass. As has been described previously, as a result of the non-adsorbed resin rate being set to greater than 0% by mass and no greater than 40% by mass, occurrence of skewed ink ejection from the recording head can be inhibited. The non-adsorbed resin rate is preferably at least 10% by mass and no greater than 40% by mass. As a result of the non-adsorbed resin rate being set to at least 10% by mass, the ink can have increased re-solubility. In the present specification, the term re-solubility of the ink means a characteristic by which dried ink attached to and dried on the ejection surfaces of the recording heads easily dissolves in either or both a cleaning liquid and a purging ink.

The non-adsorbed resin rate can be measured by centrifugating the ink using a centrifuge. The non-adsorbed resin rate can be calculated using a calculation formula "(non-adsorbed resin rate)=100×(mass of non-adsorbed resin)/(total mass of resin)=100×(mass of non-adsorbed resin)/(mass of non-adsorbed resin)+(mass of adsorbed resin)". For example, the non-adsorbed resin rate tends to decrease as the discharge amount in a wet disperser is decreased in a later-described pigment dispersion preparation process.

Examples of the resin include (meth)acrylic resin, styrene-(meth)acrylic resin, styrene-maleic acid resin, and urethane resin. In terms of stably dispersing the quinacridone pigment, the resin is preferably styrene-(meth)acrylic resin.

Styrene-(meth)acrylic resin includes, each as a repeating unit, at least one repeating unit derived from styrene or a derivative thereof and at least one repeating unit derived from (meth)acrylic acid. Preferably, the styrene-(meth) acrylic resin further includes at least one repeating unit derived from (meth)acrylic acid ester as a repeating unit.

Examples of a first monomer that can form the repeating unit derived from styrene or a derivative thereof include styrene, α-methylstyrene, and vinyltoluene. The first monomer is preferably styrene. Preferably, the repeating unit derived form styrene or a derivative thereof has a percentage content to all repeating units included in the resin of at least 25.0% by mass and no greater than 60.0% by mass.

Examples of a second monomer that can form the repeating unit derived from (meth)acrylic acid include acrylic acid and methacrylic acid. The second monomer is preferably methacrylic acid. The repeating unit derived from (meth) acrylic acid has a percentage content to all the repeating units included in the resin of preferably at least 4.5% by mass and no greater than 15.0% by mass, and more preferably at least 8.0% by mass and no greater than 11.0% by mass. When the resin includes both of a repeating unit derived from acrylic acid and a repeating unit derived from methacrylic acid, the percentage content of the repeating unit derived from (meth)acrylic acid is the total percentage content of the repeating unit derived from acrylic acid and the repeating unit derived from methacrylic acid.

Examples of a third monomer that can form the repeating unit derived from (meth)acrylic acid ester include (meth) acrylic acid alkyl ester. The (meth)acrylic acid alkyl ester is preferably (meth)acrylic acid alkyl ester having an alkyl group with a carbon number of at least 1 and no greater than 8, more preferably (meth)acrylic acid alkyl ester having an alkyl group with a carbon number of at least 1 and no greater than 4, further preferably methyl (meth)acrylate or butyl (meth)acrylate, and particularly preferably methyl methacrylate or butyl acrylate. The percentage content of the repeating unit derived from (meth)acrylic acid ester to all the repeating units included in the resin is preferably at least 35.0% by mass and no greater than 70.0% by mass, and more preferably at least 40.0% by mass and no grater than 70.0% by mass. When the resin includes two or more repeating units derived from (meth)acrylic acid ester, the percentage content of the repeating unit derived from (meth) acrylic acid ester is the total percentage content of the two or more repeating units derived from (meth)acrylic acid ester.

Preferably, the resin includes at least one repeating unit derived from (meth)acrylic acid, at least one repeating unit derived from alkyl (meth)acrylate, and a repeating unit derived from styrene. More preferably, the resin includes one repeating unit derived from (meth)acrylic acid, one or two repeating units derived from alkyl (meth)acrylate, and a repeating unit derived from styrene. Particularly preferably, the resin includes a repeating unit derived from methacrylic acid, a repeating unit derived from methyl methacrylate, a repeating unit derived from butyl acrylate, and a repeating unit derived from styrene. The percentage content of the at least one (meth)acrylic acid (preferably, the percentage content of one repeating unit derived from (meth)acrylic acid, and more preferably the percentage content of a repeating unit derived from methacrylic acid) is preferably at least 8.0% by mass and no greater than 11.0% by mass to all the repeating units included in the resin.

The resin has an acid value of preferably at least 60 mgKOH/g and no greater than 300 mgKOH/g, more preferably at least 80 mgKOH/g and no greater than 150 mgKOH/g, and further preferably at least 100 mgKOH/g and no greater than 130 mgKOH/g. As a result of the resin having an acid value of at least 60 mgKOH/g, the pigment particles favorably disperse in the aqueous medium to allow the ink to exhibit favorable colorability and coloring power. As a result of the resin having an acid value of no greater than 300 mgKOH/g by contrast, the ink has favorable preservation stability.

The resin has a mass average molecular weight of preferably at least 10,000 and no greater than 50,000, and more preferably at least 15,000 and no greater than 30,000. As a result of the mass average molecular weight of the resin being set to at least 10,000 and no greater than 50,000, the ink has favorable viscosity.

In order to inhibit occurrence of skewed ink ejection from the recording head and favorably disperse the pigment particles in the aqueous medium, a ratio (also referred to below as pigment/resin ratio) of the mass of the pigment to the mass of the resin is preferably no greater than 5.0, more preferably at least 0.1 and no greater than 2.5, and further preferably at least 0.5 and no greater than 2.5. The pigment/resin ratio can be calculated using a calculation formula "(pigment/resin ratio)=(mass of pigment)/(mass of resin)".

The resin has a percentage content in the ink of preferably at least 0.5% by mass and no greater than 8.0% by mass, and more preferably at least 1.5% by mass and no greater than 4.0% by mass. As a result of the percentage content of the resin being set to at least 0.5% by mass, agglomeration of the quinacridone pigment can be favorably inhibited. As a result of the percentage content of the resin being set to no greater than 8.0% by mass, clogging of the nozzles of the recording heads can be favorably inhibited.

<Aqueous Medium>

The aqueous medium contained in the ink is a medium containing water. The aqueous medium may function as a solvent or function as a dispersion medium. Example of the aqueous medium include water and a medium containing an organic solvent. In order to increase compatibility with water, the organic solvent contained in the aqueous medium is preferably a water-soluble organic solvent. The water-soluble organic solvent is an organic solvent that can be uniformly mixed with water at any ratio.

Examples of the water-soluble organic solvent include glycol compounds, triol compounds, glycol ether compounds, lactam compounds, nitrogen-containing compounds, acetate compounds, γ-butyrolactone, thiodiglycol, and dimethyl sulfoxide.

Examples of the glycol compounds include ethylene glycol, 1,3-propanediol, propylene glycol, 1,3-butanediol, 1,2-pentanediol, 1,5-pentanediol, 1,2-hexanediol, 1,2-octanediol, 1,8-octanediol, 3-methyl-1,3-butanediol, 3-methyl-1,2-pentanediol, 3-methyl-1,5-pentanediol, 2,4-diethyl-1,5-pentanediol, 2-butyl-2-ethyl-1,3-propanediol, diethylene glycol, dipropylene glycol, trimethylene glycol, triethylene glycol, tripropylene glycol, tetraethylene glycol, 2-ethyl-1,2-hexanediol, and thiodiglycol. A preferable glycol compound is propylene glycol, 1,5-pentanediol, triethylene glycol, or tetraethylene glycol.

Examples of the triol compounds include glycerin, 1,2,3-butanetriol, and 1,2,6-hexanetriol. A preferable triol compound is glycerin.

Examples of the glycol ether compounds include diethylene glycol diethyl ether, diethylene glycol monoethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether. A preferable glycol ether compound is triethylene glycol monobutyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

As has been described previously, the aqueous medium contains a first solvent. The first solvent has a boiling point of at least 180° C. and no greater than 280° C. As a result of the boiling point of the first solvent being at least 180° C. and no greater than 280° C., skewed ink ejection from the recording head can be inhibited. Furthermore, as a result of the boiling point of the first solvent being no greater than 280° C., images formed with the ink readily dry and can have excellent scratch resistance. In order to inhibit occurrence of skewed ink ejection from the recording head, the boiling point of the first solvent is preferably at least 188° C., more preferably at least 190° C., further preferably at least 239° C., and further more preferably at least 250° C. In order to readily dry images formed with the ink and impart excellent scratch resistance to the formed images, the boiling point of the first solvent is preferably no greater than 278° C.

Examples of the first solvent include solvents with a boiling point of at least 180° C. and no greater than 280° C. among the aforementioned water-soluble organic solvents. Preferable examples of the first solvent include triethylene glycol monobutyl ether, propylene glycol, and 1,5-pentanediol. The first solvent preferably has a percentage content to the mass of the ink of at least 5% by mass and no greater than 20% by mass. As a result of the percentage content of the first solvent being set to at least 5% by mass to the mass of the ink, occurrence of skewed ink ejection from the recording head can be further inhibited. As a result of the percentage content of the first solvent being set to no greater than 20% by mass to the mass of the ink, images formed with the ink readily dry and can have excellent scratch resistance.

Preferably, the aqueous medium further contains a second organic solvent with a boiling point of greater than 280° C. in order to inhibit occurrence of skewed ink ejection from the recording head. In the following, the "second organic solvent" may be also referred to below as "second solvent". The second solvent has a boiling point of preferably at least 280° C. and no greater than 350° C., and more preferably at least 285° C. and no greater than 320° C.

In order to increase compatibility with water, the second solvent is preferably a water-soluble organic solvent. Examples of the second solvent include solvents with a boiling point of greater than 280° C. among the aforementioned water-soluble organic solvents. Preferable examples of the second solvent include tetraethylene glycol, triethylene glycol, and glycerin. In order to further inhibit occurrence of skewed ink ejection from the recording head, the second solvent preferably has a percentage content of at least 1% by mass to the mass of the ink. In order to readily dry images formed with the ink and increase scratch resistance of the images, the second solvent preferably has a percentage content of no greater than 10% by mass to the mass of the ink.

Preferably, a ratio M1/M2 of a mass M1 of the first solvent to a mass M2 of the second solvent is at least 1.0 and no greater than 4.0. As a result of the ratio M1/M2 being set to at least 1.0, occurrence of skewed ink ejection from the recording head can be further inhibited. As a result of the ratio M1/M2 being set to no greater than 4.0, images formed with the ink readily dry and can have excellent scratch resistance.

In order to inhibit occurrence of skewed ink ejection from the recording head, the ink preferably does not contain a water-soluble organic solvent with a boiling point of less than 180° C.

Preferably, the aqueous medium is any of the following combinations (i) to (v).
  Combination (i): water, triethylene glycol monobutyl ether, and glycerin
  Combination (ii): water, propylene glycol, and glycerin
  Combination (iii): water, 1,5-pentanediol, and glycerin
  Combination (iv): water, triethylene glycol monobutyl ether, and tetraethylene glycol
  Combination (v): water, triethylene glycol monobutyl ether, and triethylene glycol The aqueous medium has a percentage content in the ink of preferably at least 30% by mass and no greater than 95% by mass, and more preferably at least 70% by mass and no greater than 95% by mass.

<Surfactant>

Preferably, the ink further contains a surfactant. The surfactant optimizes compatibility and dispersion stability of each component contained in the ink. Furthermore, the surfactant optimizes permeability of the ink to a recording medium. The surfactant is preferably a nonionic surfactant.

Examples of the nonionic surfactant include acetylenediols and ethylene oxide adducts of acetylenediols. Examples of the acetylenediols include 2,4,7,9-tetramethyl-5-decyn-4,7-diol, 3,6-dimethyl-4-octine-3,6-diol, 3,5-dimethyl-1-hexyne-3-ol, and 2,4-dimethyl-5-hexyne-3-ol. A preferably nonionic surfactant is an ethylene oxide adduct of acetylenediol or an ethylene oxide adduct of acetylene glycol. The nonionic surfactant has an HLB value of preferably at least 4 and no greater than 14, and more preferably at least 4 and no greater than 8 or at least 10 and no greater than 14. When the ink contains a surfactant, the surfactant preferably has a percentage content in the ink of at least 0.01% by mass and no greater than 1.0% by mass.

<Other Components>

The ink may further contain any known additive (specific examples include a solution stabilizer, an anti-drying agent, an antioxidant, a viscosity modifier, a pH adjuster, a neutralizer, and an antifungal agent) as necessary.

<Ink Production Method>

A method for producing the ink of the first embodiment includes a pigment dispersion preparation process and a mixing process, for example. Preferably, the method for producing the ink further includes an activated carbon treatment process as necessary. The activated carbon treatment process is preferably performed after the pigment dispersion preparation process and before the mixing process.

(Pigment Dispersion Preparation Process)

In the pigment dispersion preparation process, the quinacridone pigment, the resin, and the aqueous medium are mixed to yield a pigment dispersion. In order to sufficiently disperse the pigment particles, the pigment dispersion may further contain a surfactant. In the pigment dispersion, pigment particles constituted by the quinacridone pigment and the resin preferably have a volume median diameter ($D_{50}$) of at least 70 nm and no greater than 130 nm.

The quinacridone pigment has a percentage content in the pigment dispersion of preferably at least 5% by mass and no greater than 25% by mass, and more preferably at least 10% by mass and no greater than 20% by mass. The resin has a percentage content in the pigment dispersion of preferably at least 2% by mass and no greater than 10% by mass, and more preferably at least 4% by mass and no greater than 8% by mass. When the pigment dispersion contains a surfactant, the surfactant has a percentage content in the pigment dispersion of preferably at least 0.1% by mass and no greater than 2% by mass, and more preferably at least 0.3% by mass and no greater than 1% by mass.

The pigment dispersion can be prepared by wet dispersion of the components contained in the aforementioned pigment dispersion using a media type wet disperser. Examples of the media type wet disperser include bead mills (specific examples include "NANO GRAIN MILL" produced by Asada Iron Works Co., Ltd., "MSC MILL" produced by Nippon Coke & Engineering Co., Ltd., and "DYNO (registered Japanese trademark) MILL produced by Willy A. Bachofen AG).

Wet dispersion using a media type wet disperser uses small-diameter beads (e.g., beads with a diameter of at least 0.5 mm and no greater than 1.0 mm) as a medium, for example. Changing the diameter of the beads can change the degree of dispersion of the pigment particles and the non-adsorbed resin rate of the supernatant. The smaller the diameter of the beads is, the smaller the $D_{50}$ of the pigment particles tends to be. As the diameter of the beads is decreased, the cores containing the quinacridone pigment are easily coated with the resin and the non-adsorbed resin rate of the supernatant tends to be low. The material of the beads is not particularly limited and is preferably a hard material (e.g., glass or zirconia). The discharge amount of the media type wet disperser is at least 200 g/min and no greater than 600 g/min, for example. As the discharge amount of the media type wet disperser is decreased, the non-adsorbed resin rate tends to decrease.

(Activated Carbon Treatment Process)

In the activated carbon treatment process, the pigment dispersion is treated with activated carbon. Activated carbon treatment removes at least portions of the non-adsorbed resin and the intermediates. As a result of the ink containing a pigment dispersion such as above, the specific absorbance of the 25-fold dilution of the supernatant obtained from the ink can be easily adjusted to a value within a desired range. The activated carbon treatment is performed for example by filtering the pigment dispersion under circulation using an activated carbon filter. The flow rate of the circulated pigment dispersion is at least 100 g/min and no greater than 300 g/min, for example. The time for which the pigment dispersion is circulated is at least 5 min and no greater than 30 min, for example. Assuming that one-time passing of 1000 g of the pigment dispersion through the activated carbon is taken to be one pass, the number of times of one pass (number of times of passing) in the activated carbon treatment is no greater than 5, for example.

(Mixing Process)

In the mixing process, the pigment dispersion after the activated carbon treatment and any components (e.g., further added aqueous medium and surfactant) added as necessary are mixed using a stirrer. Mixing of each component of the ink may be followed by removal of foreign matter and coarse particles using a filter (e.g., a filter with a pore diameter of no greater than 5 μm).

The pigment dispersion has a percentage content in all raw materials of the ink of at least 25% by mass and no greater than 60% by mass, for example. Note that the ink of the first embodiment can be favorably used in a later-described inkjet recording apparatus, for example.

Second Embodiment: Inkjet Ink Recording Apparatus

The following describes an inkjet recording apparatus according to a second embodiment of the present disclosure. The inkjet recording apparatus of the second embodiment includes a recording head and a conveyance section that conveys a recording medium. The recording head ejects the ink of the first embodiment toward the recording medium. Details of the inkjet recording apparatus of the second embodiment is described next with reference to the accompanying drawings. Note that the drawings to be referenced schematically illustrate elements of configuration in order to facilitate understanding, and therefore, properties such as the size and the number of each element of configuration illustrated in the drawings may differ from actual properties.

Figure 2:
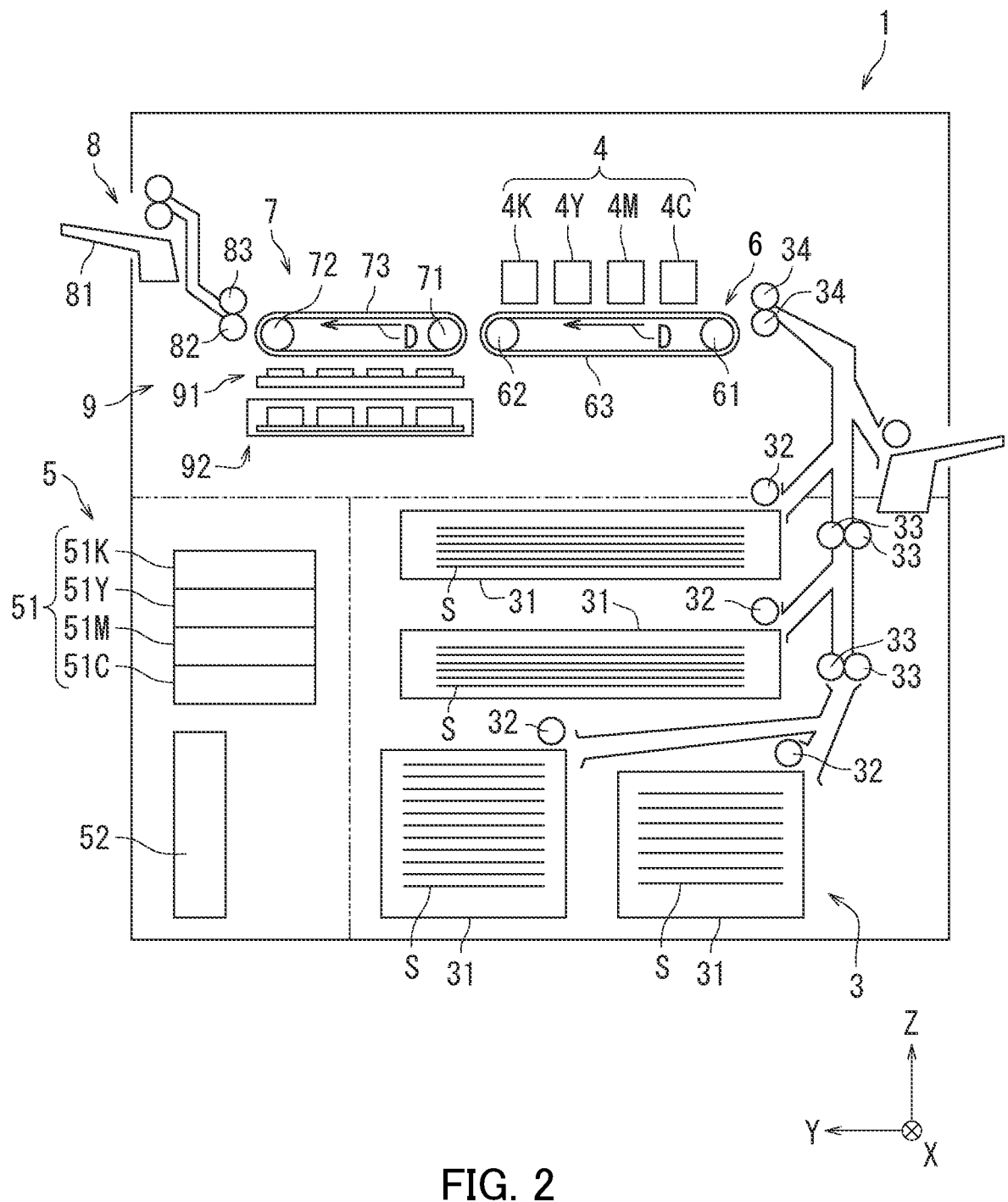
FIG. 2 is a diagram illustrating an example of an inkjet recording apparatus according to a second embodiment of the present disclosure.

FIG. 2 is a diagram illustrating a configuration of an inkjet recording apparatus 1 according to the second embodiment. The X axis, the Y axis, and the Z axis illustrated in FIG. 2 and FIGS. 3 to 5 described later are perpendicular to each other.

The inkjet recording apparatus 1 illustrated in FIG. 2 includes a sheet feed section 3, a first recording head 4C, a second recording head 4M, a third recording head 4Y, a fourth recording head 4K, a liquid accommodation section 5, a first conveyance section 6, a second conveyance section 7, an ejection section 8, and a maintenance section 9. In the following, the first recording head 4C to the fourth recording head 4K may be also referred to below simply as recording heads 4 where there is no need to distinguish them.

The sheet feed section 3 includes a plurality of sheet feed cassettes 31, a plurality of pickup rollers 32, a plurality of conveyance rollers 33, and a registration roller pair 34. Sheets S of a recording medium are stacked and accommodated in each of the sheet feed cassettes 31. The pickup rollers 32 pick up sheets S of the recording medium accommodated in the sheet feed cassettes 31 one at a time. The conveyance rollers 33 convey the sheet S picked out by a corresponding one of the pickup rollers 32. The registration roller pair 34 temporarily holds the sheet S of the recording medium conveyed by the conveyance rollers 33, and then supplies the sheet S to the first conveyance section 6 at a predetermined timing.

The recording heads 4 are disposed above a first conveyor belt 63. The first recording head 4C to the fourth recording head 4K are disposed in the stated order in terms of a conveyance direction D of the sheet S of the recording medium. The first recording head 4C to the fourth recording head 4K are located at the same height. Respective inks with four mutually different colors (e.g., cyan, magenta, yellow and black) are loaded in the first recording head 4C to the fourth recording head 4K. The ink loaded in the second recording head 4M is the ink of the first embodiment with magenta color. The recording heads 4 eject the inks toward the sheet S of the recording medium. Of the recording heads 4, the second recording head 4M ejects an ink with magenta color, which is the ink of the first embodiment, toward the sheet S of the recording medium. As a result, an image (e.g., a color image) is formed on the sheet S of the recording medium conveyed by the first conveyor belt 63.

Use of the ink of the first embodiment in the inkjet recording apparatus 1 of the second embodiment can inhibit skewed ejection of the ink from the second recording head 4M for the same reasons as described in the first embodiment.

The liquid accommodation section 5 includes a first ink tank 51C, a second ink tank 51M, a third ink tank 51Y, a fourth ink tank 51K, and a cleaning liquid tank 52. In the following, the first ink tank 51C to the fourth ink tank 51K may be also referred to below simply as ink tanks 51 where there is no need to distinguish them. The first ink tank 51C to the fourth ink tank 51K store the respective inks with four mutually different colors (e.g., cyan, magenta, yellow, and black). The ink stored in the second ink tank 51M is the ink of the first embodiment with magenta color. The first ink tank 51C to the fourth ink tank 51K supply the inks to the first recording head 4C to the fourth recording head 4K, respectively. The cleaning liquid tank 52 supplies a cleaning liquid to liquid impregnating bodies 91.

The first conveyance section 6 is disposed downstream of the sheet feed section 3 in terms of the conveyance direction D of the sheet S of the recording medium. The first conveyance section 6 includes a first driven roller 61, a first drive roller 62, and a first conveyor belt 63. The first drive roller 62 is disposed downstream of the first driven roller 61 in terms of the conveyance direction D of the sheet S of the recording medium. The first conveyor belt 63 is an endless belt wound between the first driven roller 61 and the first drive roller 62. The first drive roller 62 is rotationally driven in the anticlockwise direction in FIG. 2. This causes the first drive roller 62 to circulate the first conveyor belt 63. Circulation of the first conveyor belt 63 conveys to the second conveyance section 7 the sheet S of the recording medium fed from the sheet feed section 3 in the conveyance direction D. The first driven roller 61 follows the rotation of the first drive roller 62 to rotate through the first conveyor belt 63.

The second conveyance section 7 is disposed downstream of the first conveyance section 6 in terms of the conveyance direction D of the sheet S of the recording medium. The second conveyance section 7 includes a second driven roller 71, a second drive roller 72, and a second conveyor belt 73. The second drive roller 72 is disposed downstream of the second driven roller 71 in terms of the conveyance direction D of the sheet S of the recording medium. The second conveyor belt 73 is an endless belt wound between the second driven roller 71 and the second drive roller 72. The second drive roller 72 is rotationally driven in the anticlockwise direction in FIG. 2. This causes the second drive roller 72 to circulate the second conveyor belt 73. Circulation of the second conveyor belt 73 conveys to the ejection section 8 the sheet S of the recording medium conveyed from the first conveyance section 6 in the conveyance direction D. The second driven roller 71 follows the rotation of the second drive roller 72 to rotate through the second conveyor belt 73.

The ejection section 8 is disposed downstream of the second conveyance section 7 in terms of the conveyance direction D of the sheet S of the recording medium. The ejection section 8 includes an exit tray 81, an ejection drive roller 82, and an ejection driven roller 83. The ejection drive roller 82 and the ejection driven roller 83 are in pressure contact with each other at a location opposite to each other. The ejection drive roller 82 is rotationally driven in the anticlockwise direction in FIG. 2. The ejection driven roller 83 follows the rotation of the ejection drive roller 82 to rotate. In the above configuration, the ejection drive roller 82 and the ejection driven roller 83 eject the sheet S of the recording medium conveyed from the second conveyance section 7 onto the exit tray 81. The ejected sheet S of the recoding medium is placed on the exit tray 81.

The maintenance section 9 includes liquid impregnating bodies 91 and cleaning members 92. The liquid impregnating bodies 91 are impregnated with the cleaning liquid. The liquid impregnating bodies 91 each come into contact with a corresponding one of the ejection surfaces 42 (see FIG. 3) of the recording heads 4 to supply the cleaning liquid to the ejection surface 42. The liquid impregnating bodies 91 each are sponge, non-woven fabric, or an absorbent sheet. The cleaning members 92 wipe the ejection surfaces 42 of the recording heads 4. Wiping by the cleaning members 92 cleans ink attached to the ejection surfaces 42. The cleaning members 92 are rubber wipers, for example.

Examples of the cleaning liquid include mixed liquids of water, polyhydric alcohols, triethylene glycol monobutyl ether, and lactam. Preferably, the percentage contents of water, a polyhydric alcohol, triethylene glycol monobutyl ether, and lactam in the cleaning liquid are respectively at least 60% by mass and no greater than 70% by mass, at least 10% by mass and no greater than 15% by mass, at least 5% by mass and no greater than 10% by mass, and at least 5% by mass and no greater than 10% by mas. An example of a cleaning liquid with such a composition is a cleaning liquid for head cleaning use for TASKalfa Pro 15000c produced by KYOCERA Document Solutions Inc.

Figure 3:
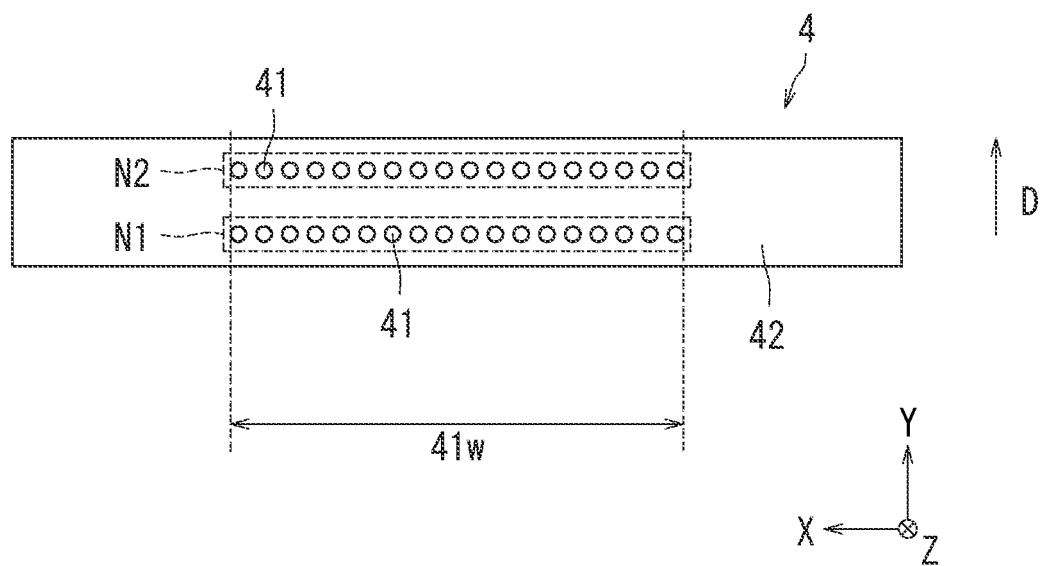
FIG. 3 is a diagram illustrating the lower surface of a recording head illustrated in FIG. 2.

Next, the recording heads 4 are further described with reference to FIG. 3. FIG. 3 is a diagram illustrating the lower surface of a recording head 4 illustrated in FIG. 2.

As illustrated in FIG. 3, the recording head 4 has a first nozzle row N1, a second nozzle row N2, and an ejection surface 42. In order to facilitate understanding, the first nozzle row N1 and the second nozzle raw N2 are each encircled by a broken line. The first nozzle row N1 and the second nozzle row N2 each include a plurality of nozzles 41. The nozzles 41 eject an ink toward the sheet S of the recording medium. The nozzles 41 open at the ejection surface 42. The first nozzle row N1 and the second nozzle row N2 are arranged side by side in terms of the conveyance direction D of the sheet S of the recording medium. The nozzles 41 are spaced from each other in a direction perpendicular to the conveyance direction D of the sheet S of the recording medium in each of the first nozzle row N1 and the second nozzle row N2. The recording head 4 is a line head, for example.

The first nozzle row N1 and the second nozzle row N2 each have a width 41w (i.e., a width of an area on which the recording head 4 is capable of performing recording) that is equal to or larger than the width of the sheet S of the recording medium. As such, the recording head 4 can perform image formation on the sheet S of the recording medium conveyed on the first conveyor belt 63 in a fixed state. That is, the inkjet recording apparatus 1 adopts a single path scheme that is a scheme without performing shuttle movement. As a result of including the above-described recording heads 4, the inkjet recording apparatus 1 of the second embodiment can perform printing at higher speed than an inkjet recording apparatus including a serial head.

Figure 4:
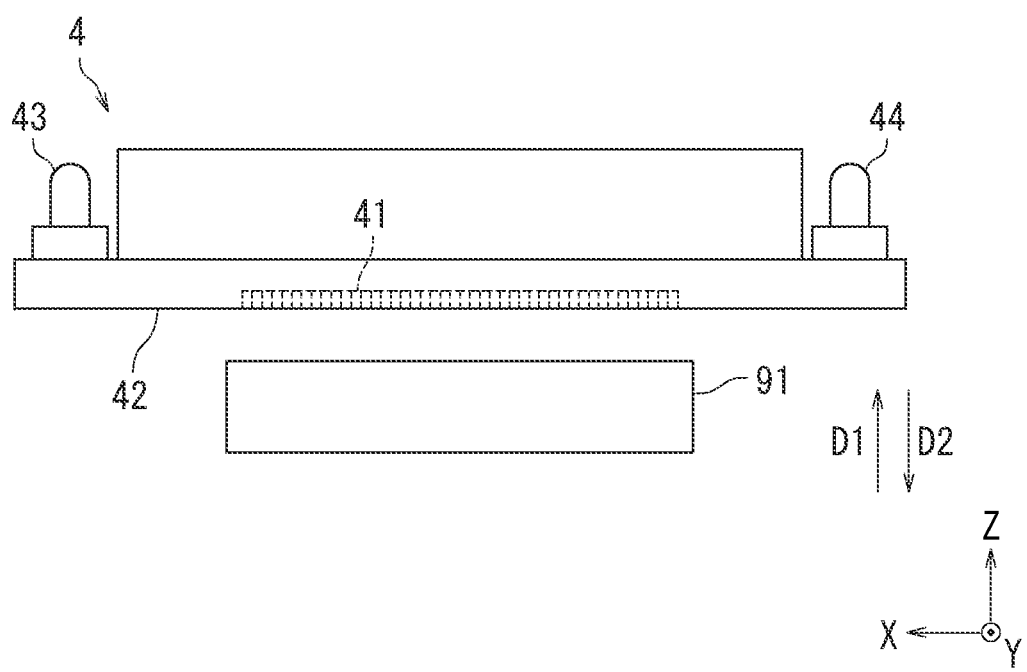
FIG. 4 is a diagram explaining a cleaning liquid supply operation.
Figure 5:
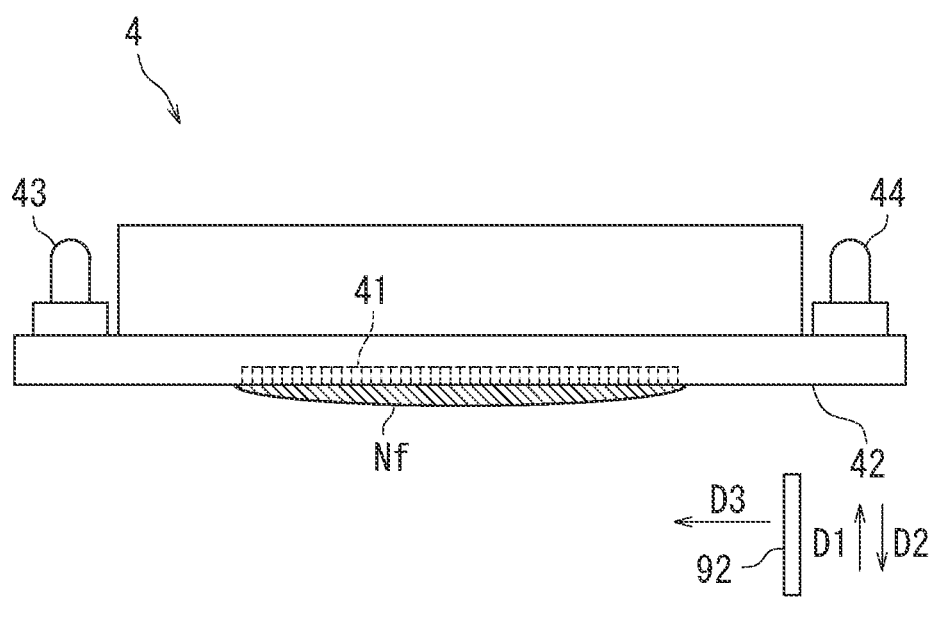
FIG. 5 is a diagram explaining a purging operation and a wiping operation.

With reference to FIGS. 4 and 5, a cleaning operation by the maintenance section 9 is described next. The cleaning operation includes a cleaning liquid supply operation, a purging operation, and a wiping operation. FIG. 4 is a diagram explaining the cleaning liquid supply operation. FIG. 5 is a diagram explaining the purging operation and the wiping operation. Note that although the nozzles 41 are not viewed in a side view of a recording head 4, the position of the nozzles 41 is indicated by broken lines in FIGS. 4 and 5 for easy understanding.

As illustrated in FIG. 4, the recording head 4 further includes an ink inlet 43 and an ink outlet 44. The ink flows into the recording head 4 through the ink inlet 43 from the ink tank 51 and flows out of the recording head 4 through the ink outlet 44.

As illustrated in FIG. 2, the liquid impregnating bodies 91 of the maintenance section 9 are disposed below the second conveyor belt 73. The cleaning members 92 of the maintenance section 9 are disposed below the liquid impregnating bodies 91. The liquid impregnating bodies 91 and the cleaning members 92 are moveable between a location opposite to the second conveyance section 7 and a location opposite to the ejection surfaces of the recording heads 4. Furthermore, the liquid impregnating bodies 91 are movable both in an ascending direction D1 and a descending direction D2 as illustrated in FIG. 4. The cleaning members 92 are movable in the ascending direction D1, the descending direction D2, and a wiping direction D3 as illustrated in FIG. 5. The "ascending direction D1" is a direction approaching the ejection surfaces 42 in the Z-axis direction. The "descending direction D2" is a direction away from the ejection surfaces 42 in the Z-axis direction. The "wiping direction D3" is a direction along the ejection surfaces 42. The liquid impregnating bodies 91 and the cleaning members 92 are moved by known drive mechanisms (not illustrated).

Here, ink attached to the ejection surfaces 42 may dry and adhere to the ejection surfaces 42. In order to clean such dried ink, the cleaning operation is performed.

First, the cleaning liquid supply operation of the cleaning operation is described. The liquid impregnating bodies 91 are impregnated with the cleaning liquid. Next, the liquid impregnating bodies 91 move to a location opposite to the ejection surfaces 42, and then moves in the ascending direction D1 as illustrated in FIG. 4. Thereafter, the liquid impregnating bodies 91 are pushed against the ejection surfaces 42. In the manner described above, the cleaning liquid impregnated in the liquid impregnating bodies 91 is attached to the ejection surfaces 42. The state in which the liquid impregnating bodies 91 are pushed against the ejection surfaces 42 is preferably kept for a specific time. The specific time is preferably at least 1 second and no greater than 5 minutes. Once the specific time elapses, the liquid impregnating bodies 91 move in the descending direction D2. As a result, the state in which the liquid impregnating bodies 91 is pushed against the ejection surfaces 42 is released.

Next, the purging operation is described. As illustrated in FIG. 5, the ink is purged from each recording head 4. In FIG.

5, the ink (purging ink) purged is indicated with a reference sign "Nf" attached thereto. Specifically, the ink is forcedly discharged from the nozzles 41 by pressure application in the recording head 4. This removes clogging and the like of the nozzles 41 and causes the purging ink Nf to attach to the ejection surfaces 42 of the recording heads 4.

Next, the wiping operation is described. The cleaning members 92 having moved to a location (location illustrated in FIG. 5) opposite to the ejection surfaces 42 move in the ascending direction D1. Thereafter, the cleaning members 92 are pushed against the ejection surfaces 42. The cleaning members 92 move in a direction (wiping direction D3 in FIG. 5) along the ejection surfaces 42 with it being pushed against the ejection surfaces 42. This allows the cleaning members 92 to wipe the ejection surfaces 42. As a result, ink (e.g., dried ink and the purging ink Nf) attached to the ejection surfaces 42 is removed together with the cleaning liquid. Thus, the ejection surfaces 42 of the recording heads 4 are cleaned. Next, the cleaning members 92 move in the descending direction D2. As a result, the state in which the cleaning members 92 are pushed against the ejection surfaces 42 is released.

When the ink of the first embodiment has excellent re-solubility in addition to ability to inhibit occurrence of skewed ejection from the recording heads 4, even ink that has attached to and dried on the ejection surface 42 is easily dissolved in either or both the purging ink Nf and the cleaning liquid. When dried ink is easily dissolved, the ejection surfaces 42 of the recording heads 4 can be easily cleaned. Furthermore, when the ink of the first embodiment can form images with excellent scratch resistance in addition to having ability to inhibit occurrence of skewed ejection from the recording heads 4, the inkjet recording apparatus 1 of the second embodiment can form images with excellent scratch resistance.

The inkjet recording apparatus 1 being an example of the inkjet recording apparatus of the second embodiment has been described so far. However, the inkjet recording apparatus of the second embodiment is not limited to the inkjet recording apparatus 1. The inkjet recording apparatus of the second embodiment may adopt a multipath method. Furthermore, the number of the nozzles 41, the intervals between the nozzles 41, and the positional relationship among the nozzles 41 in the first recording head 4C to the fourth recording head 4K may be set as appropriate according to the specification of the apparatus. The cleaning liquid supply operation may be any of cleaning liquid ejection by inkjetting, cleaning liquid application using a roller, and cleaning liquid spraying. Furthermore, the cleaning liquid supply operation, the purging operation, the wiping operation may each be repeated. The order of the cleaning liquid supply operation and the purging operation is not limited. The cleaning members 92 may move back and forth in a direction along the ejection surfaces 42. For example, it is possible that the cleaning members 92 being pushed against the ejection surfaces 42 move in a first direction (the wiping direction D3 in FIG. 5) along the ejection surfaces 42, and then move in a second direction (direction opposite to the wiping direction D3 in FIG. 5) opposite to the first direction along the ejection surfaces 42.

Examples

The following describes examples of the present disclosure. However, the present disclosure is not limited to the following examples. Note that ion exchange water may be referred to simply as water in the following examples.

[Resin Preparation]

First, resins (R-A) and (R-B) to be used for ink preparation were prepared. Table 1 shows the types, ratio, mass average molecular weight, and acid value of each of the repeating units of the resin (R-A) and (R-B).

TABLE 1

| | Resin | | | |
|---|---|---|---|---|
| | Repeating unit | | Mass average | Acid value |
| Type | Type | Ratio | molecular weight | [mgKOH/g] |
| R-A | MAA/MMA/BA/ST | 8.1/30.0/30.0/31.9 | 20,000 | 100 |
| R-B | MAA/MMA/BA/ST | 10.6/40.0/20.0/29.4 | 20,000 | 130 |

The terms in Table 1 mean as follows. "MAA" means a repeating unit derived from methacrylic acid. "MMA" means a repeating unit derived from methyl methacrylate. "BA" means a repeating unit derived from butyl acrylate. "ST" means a repeating unit derived from styrene. "Ratio" means a ratio of the mass of each repeating unit to the mass of all repeating units of a corresponding resin.

<Measurement of Resin Acid Value>

The acid value of each resin was measured in accordance with the Japanese Industrial Standards (JIS) K0070:1992.

<Measurement of Resin Mass Average Molecular Weight>

The mass average molecular weight of each resin was measured under the following measurement conditions using a gel permeation chromatography ("HLC-8020GPC", product of Tosoh Corporation). A calibration curve was plotted using n-propylbenzene and seven selected TSKgel Standard Polystyrenes. The TSKgel Standard Polystyrenes were F-40, F-20, F-4, F-1, A-5000, A-2500, and A-1000 each produced by Tosoh Corporation.

(Conditions for Mass Average Molecular Weight Measurement)

Column: "TSKgel Super Multipore HZ-H" produced by Tosoh Corporation (semi-microcolumn with 4.6 mm ID×15 cm)

Number of columns: 3

Eluent: tetrahydrofuran

Flow rate: 0.35 mL/min

Sample injection amount: 10 μL

Measurement temperature: 40° C.

Detector: refractive index (RI) detector

[Study 1: Non-Adsorbed Resin Rate]

The non-adsorbed resin rate was studied. Inks (A-1) to (A-7) used for the study were prepared according to the following methods.

<Preparation of Ink (A-1)>
(Pigment Dispersion Preparation)

A pigment dispersion was prepared so as to achieve a mixing ratio d-a shown in Table 2.

TABLE 2

| Pigment dispersion | Mixing ratio d-a [part by mass] |
|---|---|
| Water | Rest |
| Resin (R-A) | 6.0 |
| Sodium hydroxide | Specific amount |
| Pigment (PR-122) | 15.0 |
| Olfine E1010 | 0.5 |
| Total | 100.0 |

The terms used in Table 2 and Tables 5, 14, and 16 described later are as follows. "Pigment (PR-122)" means a quinacridone pigment ("TRM-11", product of Dainichiseika Color & Chemicals Mfg. Co., Ltd., C.I. Pigment Red 122). "Olfine E1010" means a nonionic surfactant ("OLFINE (registered Japanese trademark) E1010", product of Nissin Chemical Industry Co., Ltd., contents: ethylene oxide adduct of acetylenediol, active component concentration: 100% by mass, HLB value: 13.5±0.5).

First, 6.0 parts by mass of the resin (R-A) and a sodium hydroxide aqueous solution were mixed. The sodium hydroxide aqueous solution contained a specific amount of sodium hydroxide. The "specific amount" being an amount of sodium hydroxide added in Table 2 indicates 1.05 times the amount necessary for equivalent neutralization of the resin (R-A). As such, the resin (R-A) was neutralized with an equivalent amount (strictly, 105% equivalent amount) of sodium hydroxide to obtain an aqueous solution I containing the resin (R-A).

A vessel was charged with the full amount of the resultant aqueous solution I, 15.0 parts by mass of the quinacridone pigment (C.I. Pigment Red 122), 0.5 parts by mass of the nonionic surfactant ("OLFINE (registered Japanese trademark) E1010", product of Nissin Chemical Industry Co., Ltd.), and the remaining amount of water. The vessel contents were mixed using a media type wet disperser ("DYNO (registered Japanese trademark)-MILL", product of Willy A. Bachofen AG (WAB)) to obtain a mixed liquid II.

Note that "Rest" being an amount of water added in Table 2 means the amount by which the mixed liquid II becomes 100.0 parts by mass. The remaining amount of water in Table 2 is a total amount of water added to the vessel and water contained in the aqueous solution I (in detail, water contained in the sodium hydroxide aqueous solution used for resin neutralization and water produced by the neutralization reaction between the resin and sodium hydroxide).

Subsequently, dispersion treatment was carried out on the vessel contents using zirconia beads (particle diameter 0.5 mm) as a medium and a bead mill ("NANO GRAIN MILL", product of Asada Iron Works Co., Ltd.). Conditions for the dispersion using the bead mill included a temperature of 10° C., a peripheral speed of 8 m/sec, and a discharge amount of 220 g/min. Through the above, a pigment dispersion III before activated carbon treatment was obtained.

It was confirmed that pigment particles with a volume median diameter in the range of 70 nm to 130 nm have been dispersed in the pigment dispersion III. The volume median diameter of the pigment particles was measured using a dynamic light scattering type particle size distribution analyzer ("ZETASIZER NANO ZS", product of Malvern Instruments Ltd.) with a dilution used as a measurement sample. Here, the dilution was obtained by diluting the pigment dispersion III 300 times with water.

(Activated Carbon Treatment)

Activated carbon treatment was carried out on the resultant pigment dispersion III. In detail, 1800 g of the pigment dispersion III under circulation at a flow rate of 190 g/min was filtered using an activated carbon filter ("YCC-1L", product of Nihon Filter Co., Ltd., type of activated carbon: granular coconut shell activated carbon). In the following, passing of 1000 g of the pigment dispersion III through the activated carbon filter is indicated as one pass. The flow rate was 190 g/min. Therefore, the time required for one pass was 5 minutes and 15 seconds (=(1000 g)/(190 g/min). After two passes, circulation of the pigment dispersion III was stopped and a pigment dispersion IV after the activated carbon treatment was obtained. As such, the number of times of one pass (number of times of passing) in the activated carbon treatment was 2.

(Ink Preparation)

The ink (A-1) was prepared so as to have a mixing ratio i-a shown in Table 3.

TABLE 3

| Ink | Mixing ratio i-a [part by mass] |
|---|---|
| Pigment dispersion | 40.0 |
| Surfynol 420 | 0.3 |
| Triethylene glycol monobutyl ether (278° C.) | 20.0 |
| Glycerin (290° C.) | 5.0 |
| Water | Rest |
| Total | 100.0 |

The term in Table 3 and Tables 8, 10, and 12 described later means as follows. "Surfynol 420" means a nonionic surfactant (SURFYNOL (registered Japanese trademark) 420", product of Nissin Chemical Industry Co., Ltd., contents: ethylene oxide adduct of acetylene glycol, active component concentration: 100% by mass, HLB value: 4). The boiling point of each solvent is indicated in parentheses next to the solvent.

First, water was added into a flask equipped with a stirrer ("THREE-ONE MOTOR (registered Japanese trademark) BL-600", product of Shinto Scientific Co., Ltd.). The pigment dispersion IV obtained through the "activated carbon treatment" described above, the nonionic surfactant (SURFYNOL (registered Japanese trademark) 420", product of Nissin Chemical Industry Co., Ltd.), triethylene glycol monobutyl ether, and glycerin were added to the flask while the flask contents were stirred at a stirring speed of 400 rpm using the stirrer, thereby obtaining a mixed liquid V. The amount of each raw material added was as shown in Table 3. Note that "Rest" being an amount of water added in Table 3 means the amount by which the mixed liquid V becomes 100.0 parts by mass. The mixed liquid V was filtered using a filter with a pore size of 5 μm to remove foreign matter and coarse particles from the mixed liquid V. Through the above, the ink (A-1) was obtained.

<Preparation of Inks (A-2) to (A-7)>

The inks (A-2) to (A-7) were prepared according to the same method as that for preparing the ink (A-1) in all aspects other than that the discharge amount in the dispersion treatment was changed to those shown in Table 4 described later.

<Measurement>

According to the following method, a measurement target (each of the inks (A-1) to (A-7)) was centrifugated. Thereafter, the specific absorbance and the non-adsorbed resin rate of each resultant supernatant were measured. Measurement results are shown below in Table 4.

In an environment at 23° C., 2 g of the measurement target sealed in a vessel was centrifuged at a rotational speed of 140,000 rpm (corresponding to a centrifugal force of 1,050,000 G) for 3 hours using an ultra centrifuge ("HIMAC (registered Japanese trademark) CS150FNX", product of Eppendorf Him ac Technologies Co., Ltd., rotor: S140AT). The centrifugation caused precipitation of pigment particles contained in the measurement target.

<Specific Absorbance Measurement>

The full amount of the supernatant contained in the measurement target after the centrifugation was collected using a syringe. The collected supernatant was diluted 25 times with water and the resultant dilution was taken to be a measurement sample. The measurement sample set in a cell was measured under the following conditions using a spectrophotometer ("U-3000", product of Hitachi High-Tech Science Corporation) to plot an ultraviolet-visible absorption spectrum of the measurement sample (i.e., a 25-fold dilution of the supernatant). The specific absorbance of the 25-fold dilution of the supernatant was obtained from the plotted ultraviolet-visible absorption spectrum.

(Conditions for Absorbance Measurement)
Measured wavelength range: range of 200 nm to 800 nm
Scanning speed: 300 nm/min
Sampling interval: 1.00 nm
Slit width: 1 nm
Cell: quartz glass cell
Optical path length: 10 mm
Beam method: double beam
Baseline measurement: done
Reference: ion exchange water <Measurement of Non-Adsorbed Resin Rate>

The full amount of the supernatant contained in the measurement target after the centrifugation was collected. Next, the full amount of the collected supernatant was added into a disposable cup and subjected to reduced pressure drying at 60° C. for 24 hours, thereby obtaining a residue. A mass (WA) of the residue was measured. The mass (WA) of the residue was taken to be a mass of a non-adsorbed resin.

Using the following equation, a mass (WD) of the resin contained in 2 g of the measurement target was calculated from a percentage content B (=6.0% by mass) of the resin (R-A) in the pigment dispersion read from Table 2 and a percentage content C(=40.0% by mass) of the pigment dispersion in the ink read from Table 3.

$$WD = 2 \times (C/100) \times (B/100)$$

Thereafter, a non-adsorbed resin rate was calculated using the following equation from the mass (WA) of the residue obtained from 2 g of the measurement target and the mass (WD) of the resin contained in 2 g of the measurement target.

$$\text{Non-adsorbed resin rate [\% by mass]} = 100 \times WA/WD$$

<Evaluation of Skewed Ejection>

With respect to each of the inks (A-1) to (A-7), occurrence or non-occurrence of skewed ink ejection from a recording head was evaluated according to the following method. Evaluation results are shown below in Table 4.

As an evaluation apparatus used for evaluation, an inkjet recording apparatus (prototype of KYOCERA Document Solutions Japan Inc.) was used. The evaluation apparatus included a wiper and piezoelectric line heads with nozzles (radius of orifices: 10 μm) as recording heads. An evaluation target (any of the inks (A-1) to (A-7)) was loaded in a recording head for magenta ink of the evaluation apparatus. Plain paper ("C2", product of FUJIFILM Business Innovation Corp., A4-size plain paper copier (PPC) paper) was used as paper.

The temperature of each recording head was set at 40° C. The ejection amount of ink per pixel was set to 3.5 μL. Using the evaluation apparatus, an image (20.5 mm×29.0 mm) for which image processing by ink ejection from all the nozzles of the recording heads has been set was consecutively printed on sheets of the paper for 1 hour. The image (initial image) printed first in the consecutive printing and the image (printing-resistance image) printed last in the consecutive printing were visually observed. The presence or absence of white lines in the initial image and the printing-resistance image was checked. The white lines are image defects resulting from skewed ink ejection from a recording head. Skewed ink ejection from the recording heads was evaluated according to the following criteria.

(Criteria of Skewed Ejection)
Good (A): The printing-resistance image included less white lines than the initial image.
Poor (B): The printing-resistance image included more white lines than the initial image.

TABLE 4

|  | Ink | Pigment | Non-adsorbed resin rate [% by mass] | Dispersion Discharge amount [g/min] | Specific absorbance | Activated carbon treatment Number of times of passing [times] | First solvent Boiling point [° C.] | Skew |
|---|---|---|---|---|---|---|---|---|
| Example 1-1 | A-1 | PR122 | 15 | 220 | 0.15 | 2 | 278 | A |
| Example 1-2 | A-2 | PR122 | 20 | 300 | 0.15 | 2 | 278 | A |
| Example 1-3 | A-3 | PR122 | 35 | 400 | 0.15 | 2 | 278 | A |
| Example 1-4 | A-4 | PR122 | 38 | 450 | 0.15 | 2 | 278 | A |
| Example 1-5 | A-5 | PR122 | 40 | 500 | 0.15 | 2 | 278 | A |
| Comparative Example 1-1 | A-6 | PR122 | 42 | 600 | 0.15 | 2 | 278 | B |
| Example 1-6 | A-7 | PR122 | 5 | 70 | 0.15 | 2 | 278 | A |

The terms in Table 4 and Tables 6, 7, 9, 11, 13, 15, and 17 described later mean as follows. "Discharge amount" means a discharge amount in the dispersion treatment described above in "Pigment Dispersion Preparation". "Number of times of passing" means the number of times of one pass described above in "Activated Carbon Treatment". "Skew" means evaluation of skewed ink ejection from the recording head.

With respect to each of all the inks prepared in Study 1 to Study 8 described later, the specific peak was confirmed at a wavelength of 429 nm.

As shown in Table 4, the non-adsorbed resin rate of the ink (A-6) was greater than 40% by mass. Skewed ink ejection from the recording head occurred when the ink (A-6) was used.

By contrast, the non-adsorbed resin rate of each of the inks (A-1) to (A-5) and (A-7) was greater than 0% by mass and no greater than 40% by mass. Skewed ink ejection from the recording head was inhibited when any of the inks (A-1) to (A-5) and (A-7) was used.

[Study 2: Type of Quinacridone Pigment]

Next, the type of the quinacridone pigment was studied. Inks (B-1) to (B-4) were prepared according to the same method as that for preparing the ink (A-1) in all aspects other than the following changes. The mixing ratio d-a described above in "Pigment Dispersion Preparation" was changed to a mixing ratio d-b shown in Table 5. Note that the mixing ratio in the inks remained unchanged as the mixing ratio i-a. Any of the pigments shown in Table 6 was used as the pigment shown in Table 5.

With respect to each of the inks (B-1) to (B-4), the specific absorbance and the non-adsorbed resin rate were measured and occurrence or non-occurrence of skewed ink ejection from the recording head was evaluated according to the same methods as those described above in "Study 1". Measurement result and evaluation results are shown below in Table 6.

TABLE 5

| Pigment dispersion | Ratio d-b [part by mass] |
|---|---|
| Water | Rest |
| Resin (R-A) | 6.0 |
| Sodium hydroxide | Specific amount |
| Pigment (see Table 6) | 15.0 |
| Olfine E1010 | 0.5 |
| Total | 100.0 |

The terms in Table 6 mean as follows. "PR122 (A)" means C.I. Pigment Red 122 ("HOSTAPERM PINK E 02", product of Clariant (Japan) K.K.). "PR122 (B)" means C.I. Pigment Red 122 ("CINQUASIA (registered Japanese trademark) PINK D4450", product of BASF). "PV19 (C)" means C.I. Pigment Violet 19 ("HOSTAPERM RED E3B", product of Clariant (Japan) K.K.). "PV19 (D)" means C.I. Pigment Violet 19 ("HOSTAPERM RED E5B 02", product of Clariant (Japan) K.K.).

As shown in Table 6, the inks (B-1) to (B-4) contained different quinacridone pigments but each had the following features. That is, the non-adsorbed resin rate of each of the inks was greater than 0% by mass and no greater than 40% by mass. The aqueous medium of each of the inks contained a first solvent with a boiling point of at least 180° C. and no greater than 280° C. The specific absorbance of each of the inks was no greater than 0.15. Occurrence of skewed ink ejection from the recording head was inhibited when any of the inks (B-1) to (B-4) was used.

[Study 3: Specific Absorbance]

Next, the specific absorbance was studied. Inks (C-1) to (C-4) were prepared according to the same method as that for preparing the ink (A-1) in all aspects other than the following changes. The discharge amount in the dispersion treatment described above in "Pigment Dispersion Preparation" was set as shown in Table 7. The number of times of passing described above in "Activated Carbon Treatment" was set as shown in Table 7. Note that the mixing ratio in each pigment dispersion remained unchanged as the mixing ratio d-a and the mixing ratio in each ink also remained unchanged as the mixing ratio i-a.

With respect to each of the inks (C-1) to (C-4), the specific absorbance and the non-adsorbed resin rate were measured and occurrence or non-occurrence of skewed ink ejection from the recording head was evaluated according to the same methods as those described above in "Study 1". Measurement results and evaluation results are shown below in Table 7.

TABLE 6

| | Ink | Pigment | Non-adsorbed resin rate [% by mass] | Dispersion Discharge amount [g/min] | Specific absorbance | Activated carbon treatment Number of times of passing [times] | First solvent Boiling point [° C.] | Skew |
|---|---|---|---|---|---|---|---|---|
| Example 2-1 | B-1 | PR122 (A) | 15 | 220 | 0.15 | 2 | 278 | A |
| Example 2-2 | B-2 | PR122 (B) | 15 | 220 | 0.15 | 2 | 278 | A |
| Example 2-3 | B-3 | PV19 (C) | 15 | 220 | 0.15 | 2 | 278 | A |
| Example 2-4 | B-4 | PV19 (D) | 15 | 220 | 0.15 | 2 | 278 | A |

TABLE 7

| | Ink | Pigment | Non-adsorbed resin rate [% by mass] | Dispersion Discharge amount [g/min] | Specific absorbance | Activated carbon treatment Number of times of passing [times] | First solvent Boiling point [° C.] | Skew |
|---|---|---|---|---|---|---|---|---|
| Example 3-1 | C-1 | PR122 | 20 | 300 | 0.15 | 2 | 278 | A |
| Example 3-2 | C-2 | PR122 | 20 | 300 | 0.10 | 3 | 278 | A |
| Example 3-3 | C-3 | PR122 | 20 | 300 | 0.05 | 4 | 278 | A |
| Comparative Example 3-1 | C-4 | PR122 | 20 | 300 | 0.18 | 1 | 278 | B |

As shown in Table 7, the 25-fold dilution of the supernatant obtained from the ink (C-4) had a specific absorbance of greater than 0.15. Skewed ink ejection from the recording head occurred when the ink (C-4) was used.

By contrast, the specific absorbance of the 25-fold dilution of the supernatant obtained from any of the inks (C-1) to (C-3) had a specific absorbance of no greater than 0.15. Occurrence of skewed ink ejection from the recording head was inhibited when any of the inks (C-1) to (C-3) was used.

[Study 4: Boiling Point of First Solvent]

Next, the boiling point of the first solvent was studied. Inks (D-1) to (D-4) were prepared according to the same method as that for preparing the ink (C-1) in all aspects other than the following changes. The mixing ratio i-a described above in "Ink Preparation" was changed to a mixing ratio i-b shown in Table 8. Note that the mixing ratio in each pigment dispersion remained unchanged as the mixing ratio d-a. Any of the first solvents shown in Table 9 was used as the first solvent shown in Table 8.

With respect to each of the inks (D-1) to (D-4), the specific absorbance and the non-adsorbed resin rate were measured and occurrence or non-occurrence of skewed ink ejection from the recording head was evaluated according to the same methods as those described above in "Study 1". Measurement results and evaluation results are shown below in Table 9.

TABLE 8

| Ink | Mixing ratio i-b [part by mass] |
|---|---|
| Pigment dispersion | 40.0 |
| Surfynol 420 | 0.3 |
| First solvent (see Table 9) | 20.0 |
| Glycerin (290° C.) | 5.0 |
| Water | Rest |
| Total | 100.0 |

As shown in Table 9, the first solvent contained in the aqueous medium of the ink (D-4) had a boiling point of less than 180° C. Skewed ink ejection from the recording head occurred when the ink (D-4) was used.

By contrast, the first solvent contained in the aqueous medium of each of the inks (D-1) to (D-3) had a boiling point of at least 180° C. and no greater than 280° C. Occurrence of skewed ink ejection from the recording head was inhibited when any of the inks (D-1) to (D-3) was used.

[Study 5: Percentage Content of First Solvent]

Next, the percentage content of the first solvent to the mass of a corresponding ink was studied. Inks (E-1) to (E-4) were prepared according to the same method as that for preparing the ink (C-1) in all aspects other than the following changes. The mixing ratio i-a described above in "Ink Preparation" was changed to a mixing ratio i-c shown in Table 10. Note that the mixing ratio in each pigment dispersion remained unchanged as the mixing ratio d-a. The amount of triethylene glycol monobutyl ether shown in Table 10 was set to any of the amount of the first solvent shown in Table 11.

With respect to each of the inks (E-1) to (E-4), the specific absorbance and the non-adsorbed resin rate were measured and occurrence or non-occurrence of skewed ink ejection from the recording head was evaluated according to the same methods as those described above in "Study 1". Measurement results and evaluation results are shown below in Table 11.

TABLE 10

| Ink | Mixing ratio i-c [part by mass] |
|---|---|
| Pigment dispersion | 40.0 |
| Surfynol 420 | 0.3 |
| Triethylene glycol monobutyl ether (278° C.) | see Table 11 |

TABLE 9

| | Ink | First solvent Type | Boiling point [° C.] | Non-adsorbed resin rate [% by mass] | Specific absorbance | Skew |
|---|---|---|---|---|---|---|
| Example 4-1 | D-1 | Triethylene glycol monobutyl ether | 278 | 20 | 0.15 | A |
| Example 4-2 | D-2 | Propylene glycol | 188 | 20 | 0.15 | A |
| Example 4-3 | D-3 | 1,5-pentanediol | 239 | 20 | 0.15 | A |
| Comparative Example 4-1 | D-4 | 2-Methyl-1,2-pentanediol | 176 | 20 | 0.15 | B |

TABLE 10-continued

| Ink | Mixing ratio i-c [part by mass] |
|---|---|
| Glycerin (290° C.) | 5.0 |
| Water | Rest |
| Total | 100.0 |

TABLE 11

| | | First solvent | | Non-adsorbed | | |
|---|---|---|---|---|---|---|
| | Ink | Boiling point [° C.] | Amount [part by mass] (percentage content [% by mass]) | resin rate [% by mass] | Specific absorbance | Skew |
| Example 5-1 | E-1 | 278 | 5.0 | 20 | 0.15 | A |
| Example 5-2 | E-2 | 278 | 10.0 | 20 | 0.15 | A |
| Example 5-3 | E-3 | 278 | 20.0 | 20 | 0.15 | A |
| Example 5-4 | E-4 | 278 | 23.0 | 20 | 0.15 | A |

Since the total amount of the ink components was 100.0 parts by mass, the amount (unit: part by mass) of each first solvent to the mass of a corresponding one of the inks shown in Table 11 and Table 19 described later corresponds to the percentage content (unit: % by mass) of the first solvent to the mass of the ink.

As shown in Table 11, the inks (E-1) to (E-4) had the following features although they had mutually different percentage contents of the first solvent. That is, the non-adsorbed resin rate of these inks was greater than 0% by mass and no greater than 40% by mass. These inks contained a first solvent with a boiling point of at least 180° C. and no greater than 280° C. The specific absorbance of these inks was no greater than 0.15. Occurrence of skewed ink ejection from the recording head was inhibited when any of the inks (E-1) to (E-4) was used.

[Study 6: Type of Second Solvent]

Next, the type of the second solvent was studied. Inks (F-1) and (F-2) were prepared according to the same method as that for preparing the ink (C-1) in all aspects other than the following changes. The mixing ratio i-a described above in "Ink Preparation" was changed to a mixing ratio i-d shown in Table 12. Note that the mixing ratio in each pigment dispersion remained unchanged as the mixing ratio d-a. Any of the second solvents shown in Table 13 was used as the second solvent shown in Table 12.

With respect to each of the inks (F-1) and (F-2), the specific absorbance and the non-adsorbed resin rate were measured and occurrence or non-occurrence of skewed ink ejection from the recording head was evaluated according to the same methods as those described above in "Study 1". Measurement results and evaluation results are shown below in Table 13.

TABLE 12

| Ink | Mixing ratio i-d [part by mass] |
|---|---|
| Pigment dispersion | 40.0 |
| Surfynol 420 | 0.3 |
| Triethylene glycol monobutyl ether (278° C.) | 20.0 |
| Second solvent (see Table 13) | 5.0 |
| Water | Rest |
| Total | 100.0 |

TABLE 13

| | Ink | Second solvent | | Pigment | Non-adsorbed resin rate [% by mass] | Dispersion Discharge amount [g/min] | Specific absorbance | Activated carbon treatment Number of times of passing [times] | First solvent Boiling point [° C.] | Skew |
|---|---|---|---|---|---|---|---|---|---|---|
| | | Type | Boiling point [° C.] | | | | | | | |
| Example 6-1 | F-1 | Tetra EG | 314 | PR122 | 20 | 300 | 0.15 | 2 | 278 | A |
| Example 6-2 | F-2 | Tri EG | 288 | PR122 | 20 | 300 | 0.15 | 2 | 278 | A |

The terms in Table 13 mean as follows. "Tetra EG" means tetraethylene glycol. "Tir EG" means triethylene glycol.

As shown in Table 13, the inks (F-1) and (F-2) contained mutually different second solvents but each had the following features. That is, the non-adsorbed resin rate of these inks was greater than 0% by mass and no greater than 40% by mass. Each of the inks contained a first solvent with a boiling point of at least 180° C. and no greater than 280° C. The specific absorbance of these inks was no greater than 0.15. As such, skewed ink ejection from the recording head was inhibited when any of the inks (F-1) and (F-2) was used.

[Study 7: Type of Resin]

Next, the type of the resin was studied. An ink (G-1) was prepared according to the same method as that for preparing the ink (C-1) in all aspects other than the following changes. The mixing ratio d-a described above in "Pigment Dispersion Preparation" was changed to a mixing ratio d-c shown in Table 14. Note that the mixing ratio in the ink remained unchanged as the mixing ratio i-a.

With respect to the ink (G-1), the specific absorbance and the non-adsorbed resin rate were measured and occurrence or non-occurrence of skewed ink ejection from the recording head was evaluated according to the same methods as those described above in "Study 1". Measurement results and an evaluation result are shown below in Table 15.

TABLE 14

| Pigment dispersion | Mixing ratio d-c [part by mass] |
|---|---|
| Water | Rest |
| Resin (R-B) | 6.0 |
| Sodium hydroxide | Specific amount |
| Pigment (PR122) | 15.0 |
| Olfine E1010 | 0.5 |
| Total | 100.0 |

TABLE 15

| | Ink | Pigment | Non-adsorbed resin rate [% by mass] | Dispersion Discharge amount [g/min] | Specific absorbance | Activated carbon treatment Number of times of passing [time] | First solvent Boiling point [° C.] | Skew |
|---|---|---|---|---|---|---|---|---|
| Example 7-1 | G-1 | PR122 | 20 | 300 | 0.15 | 2 | 278 | A |

As shown in Table 15, the ink (G-1) contained a different resin but had the following features. That is, the non-adsorbed resin rate of the ink was greater than 0% by mass and no greater than 40% by mass. The ink contained a first solvent with a boiling point of at least 180° C. and no greater than 280° C. The specific absorbance of the ink was no greater than 0.15. As such, occurrence of skewed ink ejection from the recording head was inhibited when the ink (G-1) was used.

[Study 8: Pigment/Resin Ratio]

Next, the pigment/resin ratio was studied. Inks (H-1) and (H-2) were prepared according to the same method as that for preparing the ink (C-1) in all aspects other than the following changes. The mixing ratio d-a described above in "Pigment Dispersion Preparation" was changed to a ratio d-d shown in Table 16. The amount of the resin and the amount of each pigment shown in Table 16 were as those shown in the column "Pigment/Resin" in Table 17. Note that the mixing ratio in each ink remained unchanged as the mixing ratio i-a.

With respect to each of the inks (H-1) and (H-2), the specific absorbance and the non-adsorbed resin rate were measured and occurrence or non-occurrence of skewed ink ejection from the recording head was evaluated according to the same methods as those described above in "Study 1". Measurement results and evaluation results are shown below in Table 17.

TABLE 16

| Pigment Dispersion | Mixing ratio d-d [part by mass] |
|---|---|
| Water | Rest |
| Resin (R-A) | see table 17 |
| Sodium hydroxide | Specific amount |
| Pigment (PR122) | see table 17 |
| Olfine E1010 | 0.5 |
| Total | 100.0 |

TABLE 17

| | Ink | Pigment/resin [part by mass] | Pigment | Non-adsorbed resin rate [% by mass] | Dispersion Discharge amount [g/min] | Specific absorbance | Activated carbon treatment Number of times of passing [time] | First solvent Boiling point [° C.] | Skew |
|---|---|---|---|---|---|---|---|---|---|
| Example 7-1 | H-1 | 7.0/14.0 | PR122 | 20 | 300 | 0.15 | 2 | 278 | A |
| Example 7-2 | H-2 | 10.0/11.0 | PR122 | 20 | 300 | 0.15 | 2 | 278 | A |

The terms in Table 17 mean as follows. The ratio "7.0/14.0" means addition of 7.0 parts by mass of the pigment and 14.0 parts by mass of the resin in preparation of the corresponding pigment dispersion. The ratio "10.0/11.0" means addition of 10.0 parts by mass of the pigment and 11.0 parts by mass of the resin in preparation of the corresponding pigment dispersion.

As shown in Table 17, the inks (H-1) and (H-2) had mutually different pigment/resins ratios but each had the following features. That is, the non-adsorbed resin rate of these inks was greater than 0% by mass and no greater than 40% by mass. The aqueous mediums of these inks contained a first solvent with a boiling point of at least 180° C. and no greater than 280° C. The specific absorbance of these inks was no greater than 0.15. As such, skewed ink ejection from the recording head was inhibited when any of the inks (H-1) and (H-2) was used.

From Study 1 to Study 8 as above, the ink of the present disclosure is thought to be able to inhibit occurrence of skewed ink ejection from the recording head. Furthermore, the inkjet recording apparatus of the present disclosure that uses an ink as above is thought to be able to inhibit occurrence of skewed ink ejection from the recording head.

[Evaluation of Re-Solubility]

Re-solubility of the inks (A-1) to (A-7) and (B-1) to (B-4) as typical examples among the above-described inks was evaluated according to the following method. Evaluation results are shown below in Table 18.

The same evaluation apparatus as that used in evaluation of skewed ejection described above was used in evaluation of re-solubility. With respect to each of the inks (A-1) to (A-7) and (B-1) to (B-4), 0.3 mL of the ink was placed on the tip end of a wiper of the evaluation apparatus, and left to stand for 10 minutes in an environment at a temperature of 25° C. and a relative humidity of 60%. Next, the ejection surface of each recording head was wiped in an outbound direction (a direction opposite to the wiping direction D3 in FIG. 5) using the wiper with the ink placed thereon to spread the ink over the ejection surface. The spread ink was dried at 45° C. for 4 days to form dried ink on the ejection surface.

After the formation of the dried ink, the cleaning operation was carried out using the evaluation apparatus. In detail, nonwoven cloth with 3 g of a cleaning liquid penetrated therein was allowed to be in close contact with the ejection surface of the recording head for 30 seconds (corresponding to the cleaning liquid supply operation). The cleaning liquid used was a cleaning liquid for head cleaning use for an inkjet color production printer, "TASKalfa Pro 15000c" produced by KYOCERA Document Solutions Inc. The nonwoven cloth used was cut cloth of "BEMCOT (registered Japanese trademark) M-3II" produced by Asahi Kasei Corp. Next, the nonwoven cloth was separated from the ejection surface of the recording head. Next, 0.3 mL of the ink was forcedly discharged (purged) from the recording head (corresponding to the purging operation). Next, the ejection surface of the recording head was wiped in the return direction (wiping direction D3 in FIG. 5) using the wiper (corresponding to the wiping operation). By the wiping, the dried ink attached to the ejection surface of the recording head was removed together with the cleaning liquid and the purging ink. Details of the cleaning operation carried out in the present test was almost the same as the cleaning operation described with reference to FIGS. 4 and 5. Next, the ejection surface of the recording head was visually observed to check the presence or absence of remaining dried ink that had not been cleaned. Note that the more easily the dried ink dissolves in the cleaning solution and purging ink, the more easily it tends to be removed from the ejection surface of the recording head. Re-solubility of the inks was evaluated according to the following evaluation criteria.

(Criteria of Re-solubility)

Good (A): No dried ink was observed on the ejection surface of the recording head.

Mediocre (M): A slight amount of dried ink was observed on the ejection surface of the recording head, but this is not a problem in actual use.

TABLE 18

| | Ink | Non-adsorbed resin rate [% by mass] | Re-solubility |
|---|---|---|---|
| Example 1-1 | A-1 | 15 | A |
| Example 1-2 | A-2 | 20 | A |
| Example 1-3 | A-3 | 35 | A |
| Example 1-4 | A-4 | 38 | A |
| Example 1-5 | A-5 | 40 | A |
| Comparative Example 1-1 | A-6 | 42 | A (skewed ejection: B) |
| Example 1-6 | A-7 | 5 | M |
| Example 2-1 | B-1 | 15 | A |
| Example 2-2 | B-2 | 15 | A |
| Example 2-3 | B-3 | 15 | A |
| Example 2-4 | B-4 | 15 | A |

As shown in Table 18, ink re-solubility can be improved when the non-adsorbed resin rate is at least 10% by mass. As shown in Table 4, occurrence of skewed ink ejection from the recording head cannot be inhibited when the non-adsorbed resin rate is greater than 40% by mass. Therefore, it is thought that when the non-adsorbed resin rate is at least 10% by mass and no greater than 40% by mass, occurrence of skewed ink ejection from the recording head can be inhibited and re-solubility of the ink can be increased.

[Evaluation of Scratch Resistance]

Scratch resistance of images formed with the respective inks (D-1) to (D-4) and (E-1) to (E-4) as typical examples among the above-described inks was evaluated according to the following method. Evaluation results are shown below in Table 19.

The same evaluation apparatus as that used in evaluation of skewed ejection described above was used in evaluation of scratch resistance. Evaluation of scratch resistance was carried out in an environment at a temperature of 25° C. and a relative humidity of 60%. The ink ejection amount per pixel was set to 11 pL. Using the evaluation apparatus, a solid image (4 cm×5 cm) was printed on a sheet (also referred to below as sheet A) of the paper. Next, a rubbing test described below was carried out. In the rubbing test, a sheet (also referred to below as sheet B) of unused paper was placed over the solid image printed on the sheet A. Next, a 1-kg weight was placed on the sheet B. Thereafter, the paper B was rubbed back and forth 5 times against the solid image by moving the paper B and the weight as one unit so that only the own weight of the weight was applied. After the rubbing test, the image densities were measured at three locations in an area of the sheet A where the solid image has not been formed using a reflectance densitometer ("RD-19", product of X-Rite Inc.). The highest image density of the measured image densities was taken to be an evaluation value. When the evaluation value is no greater than 0.030, it is thought that the image has a degree of scratch resistance that allows for actual use. An image with a small evaluation value indicates that the image has excellent scratch resistance with minimal color transfer due to rubbing.

TABLE 19

| | | First solvent | | |
|---|---|---|---|---|
| | Ink | Boiling point [° C.] | Amount [part by mass] (Percentage content [% by mass]) | Scratch resistance Evaluation value |
| Example 4-1 | D-1 | 278 | 20.0 | 0.015 |
| Example 4-2 | D-2 | 188 | 20.0 | 0.011 |
| Example 4-3 | D-3 | 239 | 20.0 | 0.013 |
| Comparative Example 4-1 | D-4 | 176 | 20.0 | 0.011 (skewed ejection: B) |
| Example 5-1 | E-1 | 278 | 5.0 | 0.008 |
| Example 5-2 | E-2 | 278 | 10.0 | 0.013 |
| Example 5-3 | E-3 | 278 | 20.0 | 0.017 |
| Example 5-4 | E-4 | 278 | 23.0 | 0.030 |

As shown in Table 19, scratch resistance of images formed with an ink can be increased when the ink contains the first solvent at a percentage content in the ink of no greater than 20% by mass. As shown in Table 19, occurrence of skewed ink ejection from the recording head cannot be inhibited when the first solvent has a boiling point of less than 180° C. Therefore, occurrence of skewed ink ejection from the recording head can be inhibited and scratch resistance of images formed with an ink can be improved when the ink contains a first solvent with a boiling point of at least 180° C. and no greater than 280° C. and at a percentage content to the mass of the ink of at least 5% by mass and no greater than 20% by mass.

What is claimed is:

1. An inkjet ink comprising a quinacridone pigment, a resin, and an aqueous medium, wherein
   the resin includes an adsorbed resin adsorbed to the quinacridone pigment and a non-adsorbed resin not adsorbed to the quinacridone pigment,
   the non-adsorbed resin has a percentage content in the resin of greater than 0% by mass and no greater than 40% by mass,
   the aqueous medium contains a first organic solvent with a boiling point of at least 180° C. and no greater than 280° C., and
   on an ultraviolet-visible absorption spectrum of a 25-fold dilution of a supernatant, an absorbance at a specific peak is no greater than 0.15, the supernatant being obtained by centrifugation of the inkjet ink at 1,050,000 G for 3 hours, the specific peak being a maximum peak in a wavelength range of the ultraviolet-visible absorption spectrum of at least 400 nm and no greater than 490 nm.

2. The inkjet ink according to claim 1, wherein the non-adsorbed resin has a percentage content in the resin of at least 10% by mass and no greater than 40% by mass.

3. The inkjet ink according to claim 1, wherein the first organic solvent is triethylene glycol monobutyl ether, propylene glycol, or 1,5-pentanediol.

4. The inkjet ink according to claim 1, wherein the first organic solvent has a percentage content to a mass of the inkjet ink of at least 5% by mass and no greater than 20% by mass.

5. The inkjet ink according to claim 1, wherein
   the aqueous medium further contains a second organic solvent with a boiling point of greater than 280° C., and
   a ratio of a mass of the first organic solvent to a mass of the second organic solvent is at least 1.0 and no greater than 4.0.

6. The inkjet ink according to claim 1, wherein the specific peak is a peak derived from an intermediate used for synthesis of the quinacridone pigment.

7. An inkjet recording apparatus comprising:
   a conveyance section that conveys a recording medium; and
   a recording head that ejects an ink toward the recording medium, wherein
   the ink is the inkjet ink according to claim 1.

8. The inkjet recording apparatus according to claim 7, wherein
   the recording head is a line head.

9. The inkjet recording apparatus according to claim 7, wherein
   the recording head has an ejection surface through which nozzles for ejecting the ink are opened, and
   the inkjet ink recording apparatus further comprises a cleaning member that wipes the ejection surface.

* * * * *